(12) United States Patent
Luo (10) Patent No.: US 9,197,609 B2
(45) Date of Patent: Nov. 24, 2015

(54) METHOD, DEVICE AND SYSTEM FOR PROTECTING MULTIMEDIA DATA OF MULTIMEDIA MESSAGE

(75) Inventor: Wenping Luo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 135 days.

(21) Appl. No.: 14/006,685

(22) PCT Filed: Nov. 24, 2011

(86) PCT No.: PCT/CN2011/082885
§ 371 (c)(1),
(2), (4) Date: Sep. 23, 2013

(87) PCT Pub. No.: WO2012/129919
PCT Pub. Date: Oct. 4, 2012

(65) Prior Publication Data
US 2014/0013120 A1    Jan. 9, 2014

(30) Foreign Application Priority Data

Apr. 1, 2011 (CN) .......................... 2011 1 0082361

(51) Int. Cl.
*H04L 29/06* (2006.01)
*H04N 21/8358* (2011.01)
(Continued)

(52) U.S. Cl.
CPC ............ *H04L 63/0428* (2013.01); *G06F 21/16* (2013.01); *G10L 21/04* (2013.01); *H04N 21/2347* (2013.01); *H04N 21/41407* (2013.01); *H04N 21/4405* (2013.01);
(Continued)

(58) Field of Classification Search
USPC .......................... 713/176; 382/100; 709/206
See application file for complete search history.

(56) References Cited

U.S. PATENT DOCUMENTS

2002/0049908 A1    4/2002    Shimosato et al.
2003/0103645 A1    6/2003    Levy et al.
(Continued)

FOREIGN PATENT DOCUMENTS

CN     1741650 A     3/2006
CN     101589382 A   11/2009
(Continued)

OTHER PUBLICATIONS

International Search Report in international application No. PCT/CN2011/082885 mailed on Mar. 1, 2012. (3 pages—see entire document).

(Continued)

*Primary Examiner* — Jeffrey Pwu
*Assistant Examiner* — Samuel Ambaye
(74) *Attorney, Agent, or Firm* — Oppedahl Patent Law Firm LLC (57) ABSTRACT

The present disclosure provides a method, device and system for protecting multimedia data of a multimedia message. By performing digital watermark encryption of the multimedia data in the multimedia message at a sender of the multimedia message and performing digital watermark decryption of the multimedia data in the multimedia message at a receiver of the multimedia message, the encryption protection over the multimedia data in the multimedia message is strengthened, thus implementing the protection over an intellectual property of a user of a terminal, and improving the level and capacity of protection over the intellectual property of the user.

13 Claims, 4 Drawing Sheets

(51) Int. Cl.
*H04N 21/414* (2011.01)
*H04N 21/2347* (2011.01)
*H04N 21/4405* (2011.01)
*H04N 21/4788* (2011.01)
*G06F 21/16* (2013.01)
*G10L 21/04* (2013.01)
*G06F 15/16* (2006.01)
*G06F 17/30* (2006.01)

(52) U.S. Cl.
CPC ...... *H04N 21/4788* (2013.01); *H04N 21/8358* (2013.01); *G06F 15/16* (2013.01); *G06F 17/30* (2013.01); *H04L 2463/101* (2013.01); *H04L 2463/103* (2013.01)

(56) References Cited

U.S. PATENT DOCUMENTS

| | | | |
|---|---|---|---|
| 2005/0140788 | A1 | 6/2005 | Fox et al. |
| 2006/0031297 | A1* | 2/2006 | Zuidema ...................... 709/206 |
| 2006/0123243 | A1 | 6/2006 | Shimosato et al. |
| 2008/0044087 | A1 | 2/2008 | Levy et al. |
| 2008/0098017 | A1 | 4/2008 | Joo et al. |
| 2008/0126807 | A1 | 5/2008 | Choi et al. |
| 2008/0219494 | A1* | 9/2008 | Chen ............................. 382/100 |
| 2009/0080694 | A1 | 3/2009 | Levy et al. |
| 2010/0027837 | A1 | 2/2010 | Levy et al. |
| 2010/0034379 | A1 | 2/2010 | Nakane |

FOREIGN PATENT DOCUMENTS

| | | |
|---|---|---|
| CN | 102143451 A | 8/2011 |
| EP | 2104102 A1 | 9/2009 |
| WO | 2006043786 A1 | 4/2006 |

OTHER PUBLICATIONS

English Translation of the Written Opinion of the International Search Authority in international application No. PCT/CN2011/082885 mailed on Mar. 1, 2012. (11 pages—see entire document).
Supplementary European Search Report in European application No. 11862308.1, mailed on Dec. 9, 2014. (6 pages—see entire document).

* cited by examiner

METHOD, DEVICE AND SYSTEM FOR PROTECTING MULTIMEDIA DATA OF MULTIMEDIA MESSAGE

TECHNICAL FIELD

The present disclosure relates to the field of communication technology, and in particular to a method, device and system for protecting multimedia data of a multimedia message.

BACKGROUND

With the continuous development and fusion of technology of a mobile terminal such as a mobile phone as well as rapid hardware upgrade, the functions of the mobile terminal become more and more diversified, and there is an increasing trend toward a "multimedia mobile phone" with powerful multimedia functions including photographing, videotaping, recording and so on. A multimedia message is a message service multimedia message which supports multimedia data, and thus may be called a multimedia message service. The main feature and application of the multimedia message is that it can send multimedia data including texts, images, audios, videos and so on, and support abundant multimedia types and encoding formats. Images, audios, videos and the like in particular have added fun and content enormously to the message service. Therefore, a mobile terminal user often uses the multimedia message as a carrier and tool for sharing and sending multimedia data. At present, multimedia data in the multimedia message is mainly protected by Digital Rights Management (DRM) technology, and the protection is only aimed at a content provider and a server provider. That is to say, the DRM technology is mainly used for protecting multimedia data issued by the content provider.

However, all files, such as photos, videos, and audios taken or made by the mobile terminal user may be viewed as personal digital works, and require intellectual property protection under the user's statement. But currently there is a serious lack of means supporting intellectual property protection over the mobile terminal user.

SUMMARY

A technical problem to be solved by the present disclosure is to provide a method, device and system for protecting multimedia data of a multimedia message, such that the encryption protection over the multimedia data in the multimedia message may be strengthened, and the level and capacity of protection over an intellectual property of a user may be improved.

To solve the aforementioned technical problem, a solution provided by the present disclosure is as follows:

An embodiment of the present disclosure provides a method for protecting multimedia data of a multimedia message, including:

receiving a multimedia message;

determining, according to an identifier in the multimedia message, whether multimedia data comprised in the multimedia message are encrypted with a digital watermark; and when it is determined that the multimedia data are encrypted with the digital watermark, performing, according to digital watermark decryption information, a digital watermark decryption of the multimedia data to obtain original multimedia data.

Preferably, the digital watermark may be at least one of a text, an image and an audio.

Preferably, the method may further include:

prompting a user of information of the multimedia data when the multimedia data encrypted with the digital watermark are used.

An embodiment of the present disclosure further provides a method for protecting multimedia data of a multimedia message, including:

editing a multimedia message comprising multimedia data to be sent;

performing a digital watermark encryption of the multimedia data according to a saved digital watermark to add the digital watermark selected from saved information into the multimedia data;

creating an identifier identifying that the multimedia data comprised in the multimedia message are encrypted with the digital watermark;

sending the multimedia message bearing the identifier.

Preferably, the method may further include: before editing a multimedia message, saving obtained digital watermark information, wherein the digital watermark information is at least one of a text, an image and an audio.

An embodiment of the present disclosure further provides a device for protecting multimedia data of a multimedia message, which device is set in a mobile terminal, the device including:

a receiving module configured to receive a multimedia message;

a determining module configured to determine, according to an identifier in the multimedia message, whether multimedia data comprised in the multimedia message are encrypted with a digital watermark; and a decrypting module configured to perform, according to digital watermark decryption information, a digital watermark decryption of the multimedia data to obtain original multimedia data, when it is determined that the multimedia data are encrypted with the digital watermark.

Preferably, the device may further include:

an obtaining module configured to obtain and save the digital watermark decryption information, wherein the digital watermark is at least one of a text, an image and an audio.

Preferably, the device may further include:

a prompting module configured to prompt a user of information of the multimedia data when the multimedia data encrypted with the digital watermark are used.

An embodiment of the present disclosure further provides a device for protecting multimedia data of a multimedia message, which device is set in a mobile terminal, the device including:

an editing module configured to edit a multimedia message comprising multimedia data to be sent;

an encrypting module configured to perform a digital watermark encryption of the multimedia data according to a saved digital watermark to add the digital watermark selected from saved information into the multimedia data;

an identifying module configured to create an identifier identifying that the multimedia data comprised in the multimedia message are encrypted with the digital watermark; and a sending module configured to send the multimedia message bearing the identifier.

Preferably, the device may further include:

a saving module configured to save and manage digital watermark information, wherein the digital watermark is at least one of a text, an image and an audio.

An embodiment of the present disclosure further provides a system for protecting multimedia data of a multimedia message, including a receiving device and a sending device, wherein the receiving device includes:

a receiving module configured to receive a multimedia message;

a determining module configured to determine, according to an identifier in the multimedia message, whether multimedia data included in the multimedia message are encrypted with a digital watermark; and a decrypting module configured to perform, according to digital watermark decryption information, a digital watermark decryption of the multimedia data to obtain original multimedia data when it is determined that the multimedia data are encrypted with the digital watermark.

Preferably, in the system, the sending device may include:

an editing module configured to edit a multimedia message comprising multimedia data to be sent;

an encrypting module configured to perform a digital watermark encryption of the multimedia data according to a saved digital watermark to add the digital watermark selected from saved information into the multimedia data;

an identifying module configured to create an identifier identifying that the multimedia data comprised in the multimedia message are encrypted with the digital watermark; and a sending module configured to send the multimedia message bearing the identifier.

It may be seen from the description above that the present disclosure provides a method, device and system for protecting multimedia data of a multimedia message. By performing digital watermark encryption of the multimedia data in the multimedia message at a sender of the multimedia message and performing digital watermark decryption of the multimedia data in the multimedia message at a receiver of the multimedia message, the encryption protection over the multimedia data in the multimedia message is strengthened, thus implementing the protection over an intellectual property of a user of a terminal, and improving the level and capacity of protection over the intellectual property of the user.

DETAILED DESCRIPTION

Figure 1:
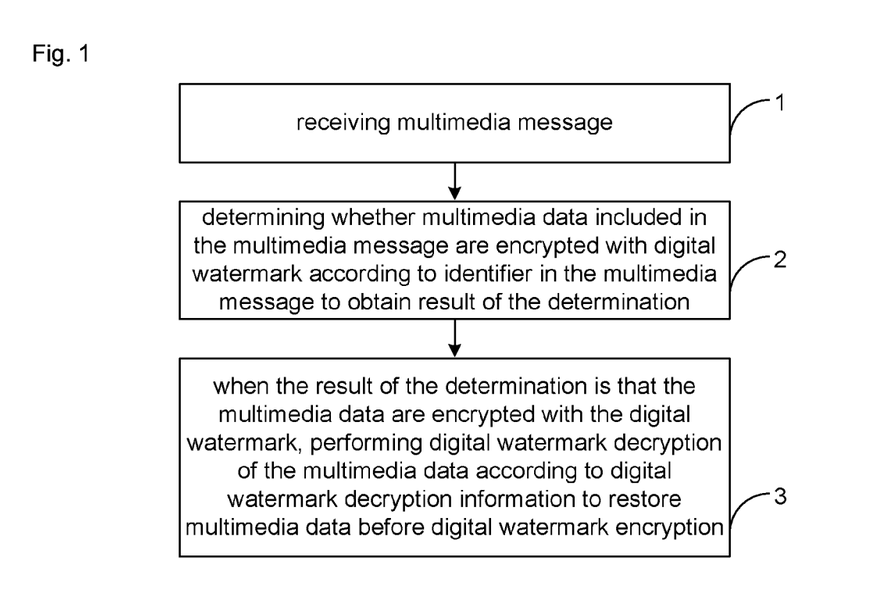
FIG. 1 is flowchart 1 of implementing a method for protecting multimedia data of a multimedia message provided by the present disclosure.

An embodiment of the present disclosure provides a method for protecting multimedia data of a multimedia message. As shown in FIG. 1, the method may specifically include:

step 1: receiving a multimedia message;

step 2: determining whether multimedia data included in the multimedia message are encrypted with a digital watermark according to an identifier in the multimedia message; and step 3: when it is determined that the multimedia data are encrypted with the digital watermark, performing a digital watermark decryption of the multimedia data according to digital watermark decryption information to obtain original multimedia data.

By implementing the method for protecting multimedia data of a multimedia message provided by an embodiment of the present disclosure, the encryption protection over the multimedia data in the multimedia message may be strengthened, thus implementing the protection over an intellectual property of a user of a terminal and improving the level and capacity of protection over the intellectual property of the user.

The digital watermark technology involved in an embodiment of the present disclosure is that some indicating information relevant or irrelevant to the multimedia data is embedded directly into the multimedia data without affecting the usefulness of the original content or being easily sensed or noticed by a human perceptual system. A content creator, a buyer, or information such as truthfulness and completeness may be confirmed via such information hidden in the multimedia data. The digital watermark has features such as being secure, concealed, robust, and of watermark capacity and so on. The application fields of the digital watermark expand with the development of digital watermark technology. The basic application fields of the digital watermark are copyright protection, hidden identifiers and authentications, and secure invisible communication. When the digital watermark is applied to the copyright protection, potential application markets include electronic commerce, on-line or off-line distribution of multimedia content and large-scale broadcast services. Protection of copyright of a digital work (such as computer arts, scanned images, digital music, and videos) is a hot topic at present. As a copy or modification of the digital work is very easy and may be identical with the original work, an original creator has to add a copyright symbol by utilizing some measures seriously damaging the quality of the work, while such an obviously visible symbol is prone to being tampered. The digital watermark utilizes a data hiding principle to make the copyright symbol invisible or inaudible, thus avoiding damage to the original work while implementing the objective of copyright protection.

Based on the above features of the digital watermark, the present disclosure provides a method, device and system for protecting the multimedia data in the multimedia message by using digital watermark technology, and for giving the user who creates the multimedia data a necessary prompt when extracting the multimedia data, thus protecting the digital work of the user sending the multimedia message and giving the receiver of the multimedia message sufficient rights to know, so as to avoid unauthorized release or use of the work or harm to the interest of both sides. Note that the present disclosure does not limit what digital watermark algorithm is particularly used, so long as digital watermark encryption of the multimedia data included in the multimedia message can be implemented.

Since transmission of the multimedia message involves a sender and a receiver, the sender sending the multimedia message and the receiver receiving the multimedia message may as well be involved in an embodiment of the present disclosure. Furthermore, the sender and the receiver may be one terminal.

Figure 2:
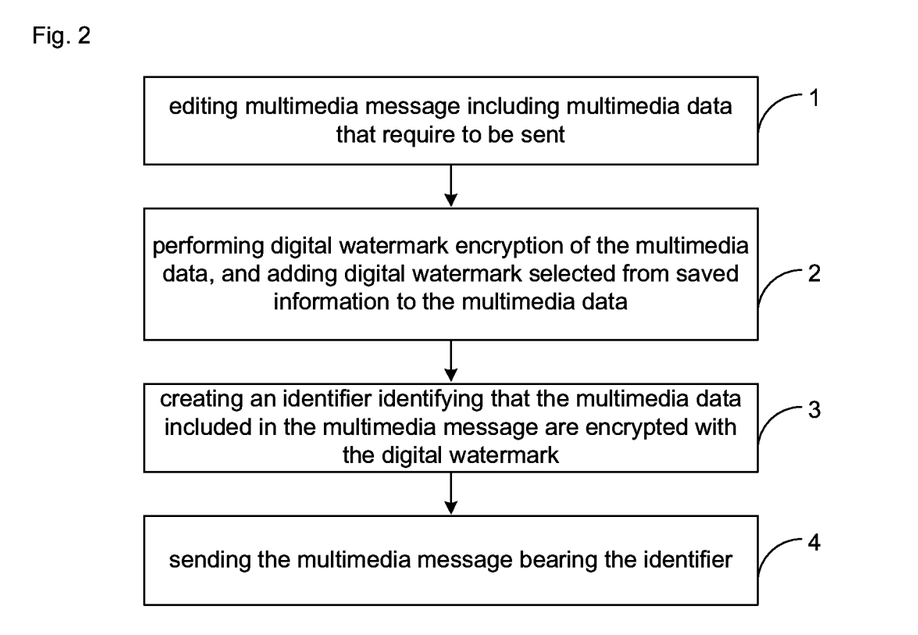
FIG. 2 is flowchart 2 of implementing the method for protecting multimedia data of the multimedia message provided by the present disclosure.

In an optional embodiment of the present disclosure, the process of sending the multimedia message by the sender, as shown in FIG. 2, includes:

step1: editing a multimedia message including multimedia data to be sent;

step2: performing digital watermark encryption of the multimedia data, and adding digital watermark selected from saved information to the multimedia data;

step3: creating an identifier identifying that the multimedia data included in the multimedia message are encrypted with the digital watermark; and step4: sending the multimedia message bearing the identifier.

In a specific embodiment, based on a terminal, the user as the receiver may obtain a multimedia message by means such as editing, and add one or more to-be-sent multimedia data (i.e. digital works of the user) into the multimedia message in a form such as an attachment. The multimedia data involved in an embodiment of the present disclosure may be data files such as photographs taken, videos and audios recorded, and the like.

In an embodiment of the present disclosure, the multimedia data in the multimedia message may be encrypted based on a saved digital watermark, and a saved and managed digital watermark may be added into the multimedia data. In an embodiment of the present disclosure, the digital watermark may be added into the multimedia data based on any digital watermark algorithm.

The digital watermark involved in an embodiment of the present disclosure may exist in a variety of forms such as texts, audios, videos, images and the like, and are saved at the sender, so as to be managed. Moreover, when added, one or multiple combined digital watermarks may be added into the multimedia data. In addition, if the multimedia data added to the multimedia message has been encrypted themselves, digital watermark encryption may not be needed in an embodiment of the present disclosure.

In an embodiment of the present disclosure, the multimedia data in a short message may be identified as being digital-watermark processed. There is no limit on the form of manifestation of the identifier in an embodiment of the present disclosure. As most multimedia messages exist based on documents encoded in a Synchronized Multimedia Integration Language (SMIL), the process of digital-watermark processing of the multimedia data in an identifying short message involved in an embodiment of the present disclosure is illustrated below with the example of SMIL encoding. Specifically, in order to effectively distinguish an ordinary multimedia file from a multimedia file added with the digital watermark, an embodiment of the present disclosure may expand an attribute tag in Media Content Modules of an SMIL standard document and name the attribute tag as watermark. The value of the attribute may be defined as follows:

watermark="1" represents that there is digital watermark protection;

watermark="0" represents that there is no digital watermark protection.

In addition, for Media Content Modules without the watermark attribute tag, by default, the multimedia data are deemed to be not protected by digital watermark encryption in an embodiment of the present disclosure.

it is illustrated with the example of par encoding in one typical SMIL document:

```
<par dur="20000ms">
<img src="image.gif" region="Image" watermark="1"/>
<audio src="audio.amr" watermark="0"/>
<text src="Text1.txt" region="Text" />
</par>
```

The above encoding illustrates that the slide includes three media contents which are Text1.txt, audio.amr, and image.gif, respectively, wherein audio.amr is not added with the digital watermark while image.gif is added with the digital watermark.

After encryption and identification, the sender may send the multimedia message to the receiver.

The receiver may receive and decrypt the encrypted and tagged multimedia data based on the process shown in FIG. 1.

In a specific embodiment, for the received multimedia message, the receiver may decide whether the multimedia data in the multimedia message are encrypted with the digital watermark based on whether the multimedia message has a corresponding identifier for digital watermark encryption, for example, the attribute tag watermark obtained when the receiver decodes the SMIL document, and the like.

An embodiment of the present disclosure may process a multimedia message without an identifier for digital watermark encryption as an ordinary multimedia message.

For a multimedia message with an identifier for digital watermark encryption, the receiver may decrypt the multimedia data included in the received multimedia message based on digital watermark decryption information to restore the multimedia data tagged and encrypted with the digital watermark.

In the embodiment of the present disclosure, there is no limit to the means and method for the receiver to obtain the digital watermark decryption information. For example, by consulting beforehand with the sender, the receiver may determine and save the relevant information on watermark encryption and decryption, so that the receiver determines the digital watermark decryption information according to a certain special identifier of the received multimedia message or multimedia data. Or the sender carries digital watermark decryption information in the multimedia message including the multimedia data encrypted with the digital watermark so that the receiver performs the corresponding digital watermark decryption. Or, after receiving the multimedia data, the receiver may also obtain the corresponding digital watermark decryption information by interacting with the sender, and so on. The digital watermark decryption is the inverse process of the digital watermark encryption, and is therefore not explained anymore.

In an embodiment of the present disclosure, when the multimedia data encrypted with the digital watermark are used, a user, such as a receiving user, may be prompted of relevant information, so as to process correspondingly. Specifically, the prompt information may be about the creator information and the creation time of the multimedia data obtained in the digital watermark decryption, or about asking for authorization before using the multimedia data.

Figure 3:
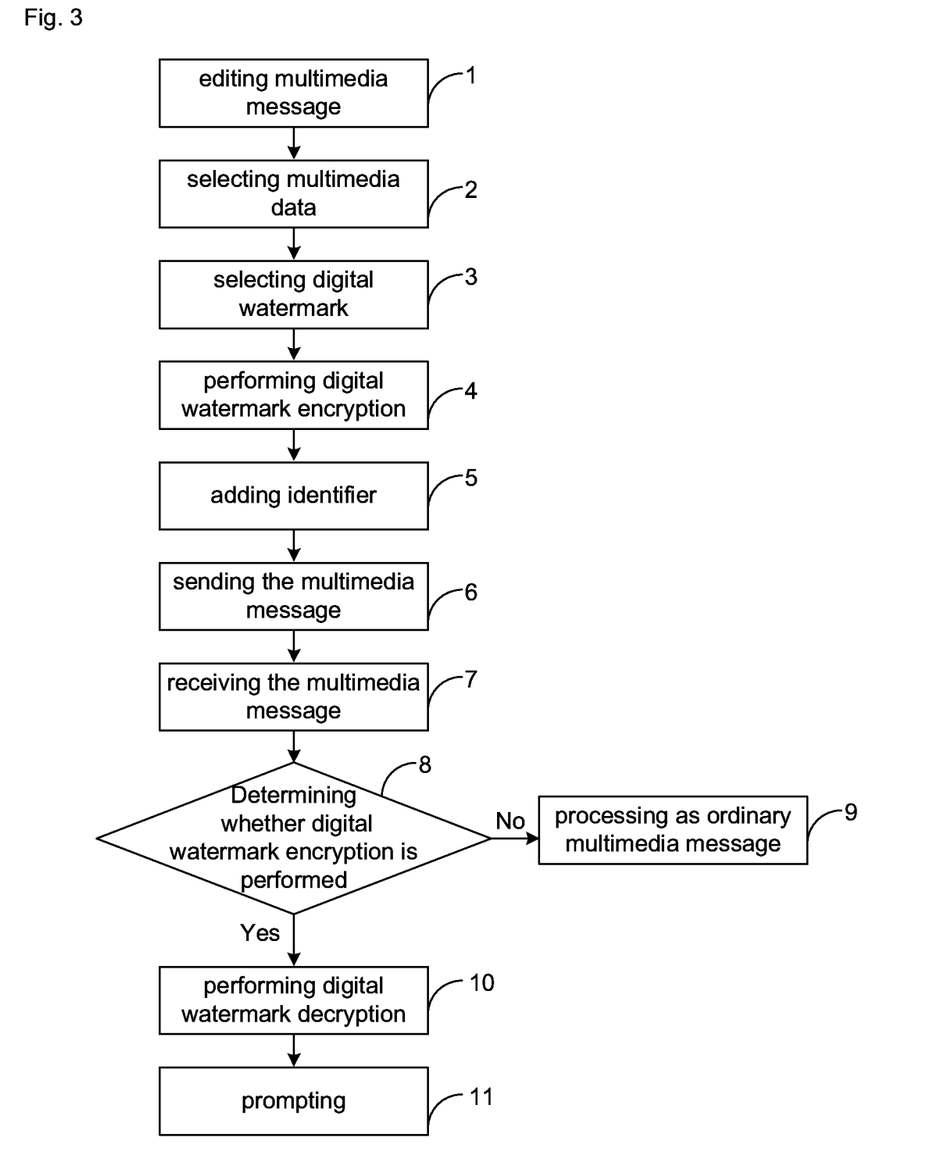
FIG. 3 is flowchart 3 of implementing the method for protecting multimedia data of the multimedia message provided by the present disclosure.

The specific implementation of the method for protecting multimedia data of a multimedia message provided by an embodiment of the present disclosure is described in detail below with reference to FIG. 3. The implementation specifically includes:

step 1: editing a multimedia message;

Specifically, the sender may insert a digital work such as a photo, a video, and an audio obtained with a camera, a video camera, or a recorder into the multimedia message as an attachment of the multimedia message;

step 2: selecting multimedia data in which a digital watermark is to be added;

the multimedia data may be one or more multimedia data in the attachment of the multimedia message;

if the multimedia data already contains encryption information, for example the digital watermark decryption information, a repeated addition of the digital watermark may be rejected.

step 3: selecting from saved digital watermark information, the digital watermark which is required to be added into the multimedia data attachment;

the watermark may be a text, an image, an audio, or the like;

step 4: performing digital watermark encryption based on a certain digital watermark algorithm to add the selected digital watermark into the multimedia data attachment, and outputting the encrypted data stream;

step 5: creating an identifier identifying that the multimedia data in the multimedia message are encrypted with the digital watermark;

Specifically, the sender may add the watermark attribute tag to the multimedia attachment in which the digital watermark is added, and assign a value of 1 to the watermark attribute tag;

step 6: sending the multimedia message;

step 7: receiving the multimedia message;

The receiver may also save the received multimedia message;

step 8: determining whether multimedia data comprised in the multimedia message are encrypted with the digital watermark;

Specifically, the receiver may analyze the SMIL document and search for the watermark tag. When there is no watermark tag in the SMIL or the value of the watermark tag is 0, it is recorded that the corresponding attachment is not added with digital watermark protection, otherwise it is recorded that the attachment is added with digital watermark protection. For the multimedia message without digital watermark, the receiver may execute step 9: processing it as the ordinary multimedia message, otherwise the receiver may perform step 10.

step 10: performing the digital watermark decryption of the multimedia data;

Specifically, the receiver may perform the digital watermark decryption of the multimedia data based on the obtained digital watermark decryption information to obtain the original multimedia data, and record the relevant information in the multimedia data, including the creator information, the creation date, and so on.

step 11: when the multimedia data encrypted with the digital watermark are used, such as when the receiver want to extract or save the multimedia data when viewing the multimedia message, the user may be prompted of the relevant information of the multimedia data such as the creator information and the creation date of the multimedia file, and the requirement for authorization from the author in using the multimedia data and so on, without limiting the means and content of the prompt.

It may be seen from the description above that with the method for protecting multimedia data of a multimedia message provided by the present disclosure, by performing the digital watermark encryption of the multimedia data in the multimedia message at the sender of the multimedia message, performing the digital watermark decryption of the multimedia data in the multimedia message at the receiver of the multimedia message, and prompting the receiver when the receiver is using the multimedia data, the encryption protection over the multimedia data in the multimedia message is strengthened, thus implementing the protection over an intellectual property of a user of a terminal, and improving the level and capacity of protection over the intellectual property of the user.

Figure 4:
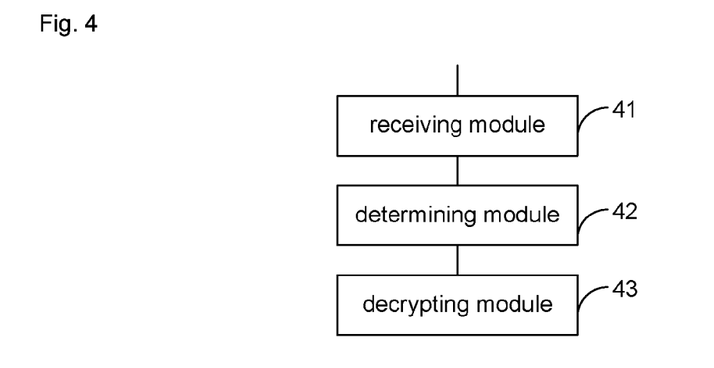
FIG. 4 is schematic diagram 1 of the structure of a device for protecting multimedia data of the multimedia message provided by an embodiment of the present disclosure.

An embodiment of the present disclosure further provides a device for protecting multimedia data of a multimedia message which may be set in a mobile terminal, as shown in FIG. 4. The device may specifically include:

a receiving module 41 configured to receive a multimedia message;

a determining module 42 configured to determine whether multimedia data included in the multimedia message are encrypted with a digital watermark according to an identifier in the multimedia message;

a decrypting module 43 configured to perform, when it is determined that the multimedia data are encrypted with the digital watermark, a digital watermark decryption of the multimedia data to obtain original multimedia data. according to digital watermark decryption information.

In one optional embodiment of the present disclosure, the device further includes:

an obtaining module 44 configured to obtain and save the digital watermark decryption information for use by the decrypting module 43.

The watermark is at least one of the text, an image and an audio.

In one optional embodiment of the present disclosure, the device further includes:

a prompting module 45 configured to prompt a user of information of the multimedia data when the multimedia data encrypted with the digital watermark are used.

Figure 5:
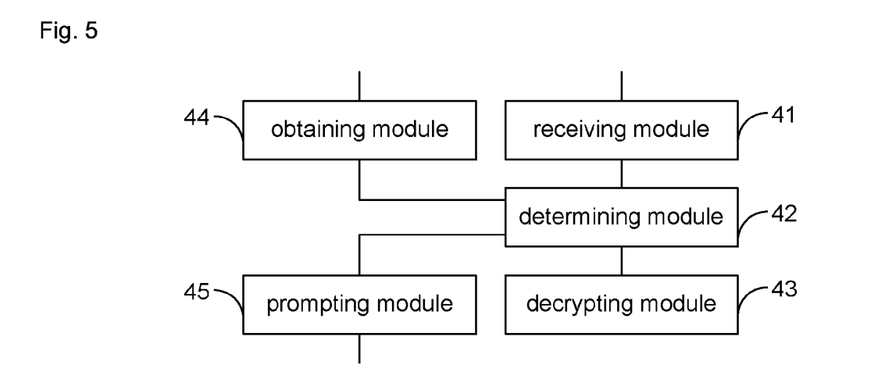
FIG. 5 is schematic diagram 2 of the structure of the device for protecting multimedia data of the multimedia message provided by an embodiment of the present disclosure.

The device for protecting multimedia data of a multimedia message provided by an embodiment of the present disclosure may be specifically interpreted as a receiving device. The schematic diagram of the specific structure of the device may also be as shown in FIG. 5.

It may be seen from the description above that with the device for protecting multimedia data of a multimedia message provided by the present disclosure, by performing the digital watermark decryption of the multimedia data in the multimedia message at the receiver of the multimedia message, and prompting the receiver when the receiver is using the multimedia data, the encryption protection over the multimedia data in the multimedia message is strengthened, thus implementing the protection over an intellectual property of a user of a terminal, and improving the level and capacity of protection over the intellectual property of the user.

Figure 6:
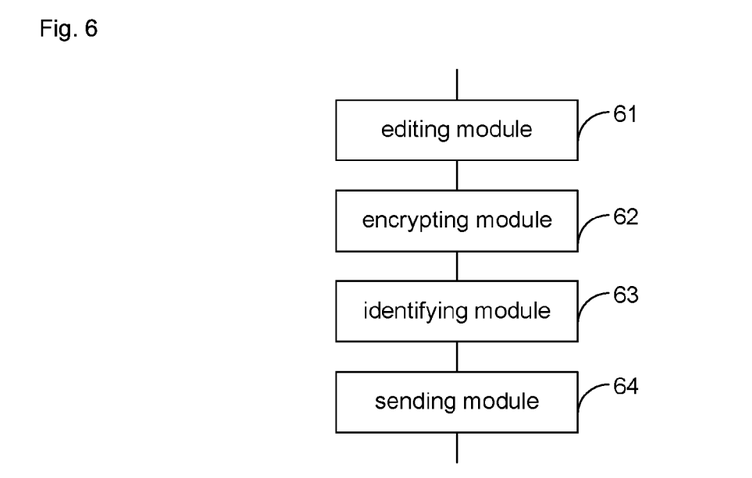
FIG. 6 is schematic diagram 3 of the structure of the device for protecting multimedia data of the multimedia message provided by an embodiment of the present disclosure.

An embodiment of the present disclosure further provides a device for protecting multimedia data of a multimedia message which may be set in a mobile terminal, as shown in FIG. 6. The device may specifically include:

an editing module 61 configured to edit a multimedia message including multimedia data to be sent;

an encrypting module 62 configured to perform a digital watermark encryption of the multimedia data and add the digital watermark selected from saved information into the multimedia data;

an identifying module 63 configured to create an identifier identifying that the multimedia data included in the multimedia message are encrypted with a digital watermark; and a sending module 64 configured to send the multimedia message bearing the identifier.

In one optional embodiment of the present disclosure, specifically, the device may further include:

a saving module 65 configured to save and manage digital watermark information;

The digital watermark is at least one of a text, an image and an audio.

Figure 7:
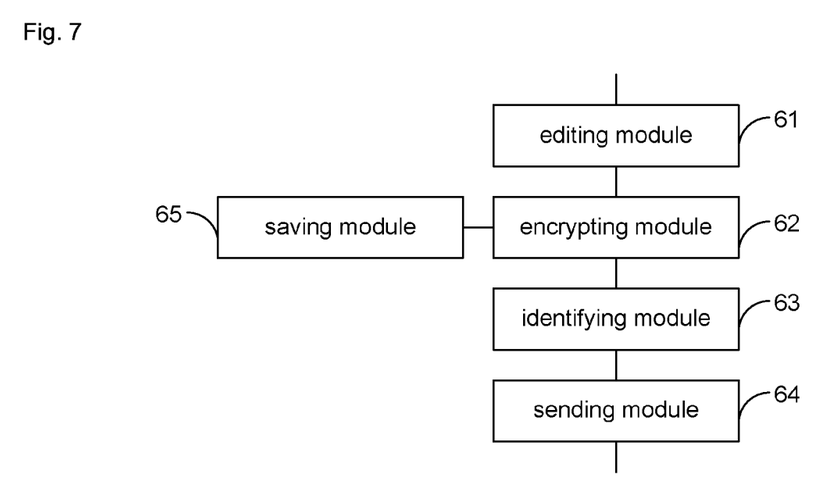
FIG. 7 is schematic diagram 4 of the structure of the device for protecting multimedia data of the multimedia message provided by an embodiment of the present disclosure.

The device for protecting multimedia data of a multimedia message provided by an embodiment of the present disclosure may be specifically interpreted as a sending device. The schematic diagram of the specific structure of the device may also be as shown in FIG. 7.

It may be seen from the description above that with the device for protecting multimedia data of a multimedia message provided by the present disclosure, by performing the digital watermark encryption of the multimedia data in the multimedia message at the sender of the multimedia message, the encryption protection over the multimedia data in the multimedia message is strengthened, thus implementing the protection over an intellectual property of a user of a terminal, and improving the level and capacity of protection over the intellectual property of the user.

Figure 8:
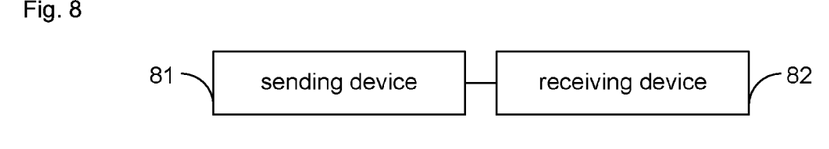
FIG. 8 is schematic diagram 1 of the structure of a system for protecting multimedia data of the multimedia message provided by an embodiment of the present disclosure.

An embodiment of the present disclosure further provides a system for protecting multimedia data of a multimedia message, as shown in FIG. 8. The system may specifically include a receiving device 81 and a sending device 82.

The receiving device 81 may specifically include:

a receiving module configured to receive a multimedia message;

a determining module configured to determine whether multimedia data included in the multimedia message are encrypted with a digital watermark according to an identifier in the multimedia message; and a decrypting module configured to perform, when it is determined that the multimedia data are encrypted with the digital watermark, a digital watermark decryption of the multimedia data to obtain original multimedia data. according to digital watermark decryption information.

The sending device 82 may specifically include:

an editing module configured to edit a multimedia message including multimedia data to be sent;

an encrypting module configured to perform a digital watermark encryption of the multimedia data to add a digital watermark selected from saved information into the multimedia data;

an identifying module configured to create an identifier identifying that the multimedia data included in the multimedia message are encrypted with a digital watermark; and a sending module configured to send the multimedia message bearing the identifier.

Note that the mobile terminal involved in an embodiment of the present disclosure may be configured with both a sending device and a receiving device which can implement a corresponding function in the system, thereby implementing operations such as the receiving and sending of the multimedia message as well as the digital watermark encryption and decryption of the multimedia data.

It may be seen from the description above that with the system for protecting multimedia data of a multimedia message provided by the present disclosure, by performing the digital watermark encryption of the multimedia data in the multimedia message at the sender of the multimedia message, performing the digital watermark decryption of the multimedia data in the multimedia message at the receiver of the multimedia message, and prompting the receiver when the receiver is using the multimedia data, the encryption protection over the multimedia data in the multimedia message is strengthened, thus implementing the protection over an intellectual property of a user of a terminal, and improving the level and capacity of protection over the intellectual property of the user.

What described are merely embodiments of the present disclosure. It should be noted that it is possible for those skilled in the art to make some improvements and modifications without departing from the principle of the present disclosure, and such improvements and modifications should be considered to fall in the scope of the present disclosure as well.

INDUSTRIAL APPLICABILITY

By performing digital watermark encryption of the multimedia data in the multimedia message at a sender of the multimedia message and performing digital watermark decryption of the multimedia data in the multimedia message at a receiver of the multimedia message, the present disclosure strengthens the encryption protection over the multimedia data in the multimedia message, thus implementing the protection over an intellectual property of a user of a terminal, and improving the level and capacity of protection over the intellectual property of the user

The invention claimed is:

1. A method for protecting multimedia data of a multimedia message, comprising:

receiving a multimedia message;

determining, according to an identifier in the multimedia message, whether multimedia data comprised in the multimedia message are encrypted with a digital watermark; and when it is determined that the multimedia data are encrypted with the digital watermark, performing, according to digital watermark decryption information, a digital watermark decryption of the multimedia data to obtain original multimedia data, wherein it is determined that the multimedia data comprised in the multimedia message are encrypted with a digital watermark when there is a watermark attribute tag with a value of 1 in a Synchronized Multimedia Integration Language (SMIL) document of the multimedia message, wherein it is determined that the multimedia data comprised in the multimedia message are encrypted with no digital watermark when there is a watermark attribute tag with a value of 0 or when there is no watermark attribute tag in the SMIL document of the multimedia message.

2. The method according to claim 1, wherein the digital watermark is at least one of a text, an image and an audio.

3. The method according to claim 1, further comprising:

prompting a user of information of the multimedia data when the multimedia data encrypted with the digital watermark are used.

4. A method for protecting multimedia data of a multimedia message, comprising:

editing a multimedia message comprising multimedia data to be sent;

performing a digital watermark encryption of the multimedia data according to a saved digital watermark;

creating an identifier identifying that the multimedia data comprised in the multimedia message are encrypted with the digital watermark;

sending the multimedia message bearing the identifier,
wherein the creating an identifier identifying that the multimedia data comprised in the multimedia message are encrypted with the digital watermark comprises: assigning a value of 1 to a watermark attribute tag in a Synchronized Multimedia Integration Language (SMIL) document of the multimedia message.

5. The method according to claim 4, further comprising:
before editing a multimedia message,
saving obtained digital watermark information, wherein the digital watermark information is at least one of a text, an image and an audio.

6. A device for protecting multimedia data of a multimedia message, which device is set in a mobile terminal, the device comprising:
a receiving module configured to receive a multimedia message;
a determining module configured to determine, according to an identifier in the multimedia message, whether multimedia data comprised in the multimedia message are encrypted with a digital watermark; and
a decrypting module configured to perform, according to digital watermark decryption information, a digital watermark decryption of the multimedia data to obtain original multimedia data when it is determined that the multimedia data are encrypted with the digital watermark,
wherein the determining module determines that the multimedia data comprised in the multimedia message are encrypted with a digital watermark when there is a watermark attribute tag with a value of 1 in a Synchronized Multimedia Integration Language (SMIL) document of the multimedia message,
wherein the determining module determines that the multimedia data comprised in the multimedia message are encrypted with no digital watermark when there is a watermark attribute tag with a value of 0 or when there is no watermark attribute tag in the SMIL document of the multimedia message.

7. The device according to claim 6, further comprising:
an obtaining module configured to obtain and save the digital watermark decryption information,
wherein the digital watermark is at least one of a text, an image and an audio.

8. The device according to claim 6, further comprising
a prompting module configured to prompt a user of information of the multimedia data when the multimedia data encrypted with the digital watermark are used.

9. A device for protecting multimedia data of a multimedia message, which device is set in a mobile terminal, the device comprising:
an editing module configured to edit a multimedia message comprising multimedia data to be sent;
an encrypting module configured to perform a digital watermark encryption of the multimedia data according to a saved digital watermark;
an identifying module configured to create an identifier identifying that the multimedia data comprised in the multimedia message are encrypted with the digital watermark; and
a sending module configured to send the multimedia message bearing the identifier,
wherein the identifying module is configured to create the identifier identifying that the multimedia data comprised in the multimedia message are encrypted with the digital watermark by assigning a value of 1 to a watermark attribute tag in a Synchronized Multimedia Integration Language (SMIL) document of the multimedia message.

10. The device according to claim 9, further comprising
a saving module configured to save and manage digital watermark information,
wherein the digital watermark is at least one of a text, an image and an audio.

11. A system for protecting multimedia data of a multimedia message, comprising a receiving device and a sending device, wherein the receiving device comprises:
a receiving module configured to receive a multimedia message;
a determining module configured to determine, according to an identifier in the multimedia message, whether multimedia data comprised in the multimedia message are encrypted with a digital watermark; and
a decrypting module configured to perform, according to digital watermark decryption information, a digital watermark decryption of the multimedia data to obtain original multimedia data when it is determined that the multimedia data are encrypted with the digital watermark,
wherein the determining module determines that the multimedia data comprised in the multimedia message are encrypted with a digital watermark when there is a watermark attribute tag with a value of 1 in a Synchronized Multimedia Integration Language (SMIL) document of the multimedia message,
wherein the determining module determines that the multimedia data comprised in the multimedia message are encrypted with no digital watermark when there is a watermark attribute tag with a value of 0 or when there is no watermark attribute tag in the SMIL document of the multimedia message.

12. The system according to claim 11, wherein the sending device comprises:
an editing module configured to edit a multimedia message comprising multimedia data to be sent;
an encrypting module configured to perform a digital watermark encryption of the multimedia data according to a saved digital watermark;
an identifying module configured to create an identifier identifying that the multimedia data comprised in the multimedia message are encrypted with the digital watermark; and
a sending module configured to send the multimedia message bearing the identifier,
wherein the identifying module is configured to create the identifier identifying that the multimedia data comprised in the multimedia message are encrypted with the digital watermark by assigning a value of 1 to a watermark attribute tag in the SMIL document of the multimedia message.

13. The device according to claim 7, further comprising
a prompting module configured to prompt a user of information of the multimedia data when the multimedia data encrypted with the digital watermark are used.

* * * * *